United States Patent [19]

Laitar

[11] 4,197,385

[45] Apr. 8, 1980

[54] FURAN-PHENOLIC RESINS FOR COLLAPSIBLE FOUNDRY MOLDS

[75] Inventor: Robert Laitar, Chicago, Ill.

[73] Assignee: CPC International Inc., Englewood Cliffs, N.J.

[21] Appl. No.: 932,882

[22] Filed: Aug. 11, 1978

Related U.S. Application Data

[62] Division of Ser. No. 816,103, Jul. 12, 1977, Pat. No. 4,134,442, which is a division of Ser. No. 623,132, Oct. 16, 1975, Pat. No. 4,051,301.

[51] Int. Cl.$^2$ ................................................ C08G 8/28
[52] U.S. Cl. .................................... 525/501; 528/129; 528/205; 528/249; 525/480; 525/503
[58] Field of Search .............. 528/130, 205, 249, 131; 525/501

[56] References Cited

U.S. PATENT DOCUMENTS

| | | | |
|---|---|---|---|
| 2,321,493 | 6/1943 | Korten | 528/205 |
| 2,453,704 | 11/1948 | Dunlop et al. | 528/205 |
| 2,456,628 | 12/1948 | Dunlop et al. | 528/205 |
| 3,024,215 | 3/1962 | Freeman et al. | 260/17.2 |
| 3,312,650 | 4/1967 | Case et al. | 260/29.3 |
| 3,549,584 | 12/1970 | Sekera | 260/38 |
| 4,051,301 | 9/1977 | Laitar | 528/159 |

FOREIGN PATENT DOCUMENTS 627717  8/1949  United Kingdom .................... 260/844

OTHER PUBLICATIONS

Furfurylated Novolak Resins, Ind. Eng. Chem. 50, 1675–1676(1958), Brown et al.

*Primary Examiner*—Edward M. Woodberry
*Attorney, Agent, or Firm*—Stanley M. Parmerter

[57] ABSTRACT

A resin for coating sand and a resin-coated sand produced therefrom wherein the resin is prepared by incorporating furan into a phenolic novolak resin. In the preferred practice, the resin is produced by reaction of furfuryl alcohol with a phenolic compound at an acid pH to give a furfuryl-phenolic intermediate in a first step, and then, in a second step, reacting the furfuryl-phenolic intermediate with a lower aliphatic aldehyde to produce the resin. The resin-coated sands of the present invention provide unexpectedly improved shakeout and collapsibility characteristics in the shell process.

36 Claims, No Drawings

FURAN-PHENOLIC RESINS FOR COLLAPSIBLE FOUNDRY MOLDS

This is a division of copending application Ser. No. 816,103, filed July 12, 1977, now U.S. Pat. No. 4,134,442, issued Jan. 16, 1979, which is a division of Ser. No. 623,132, filed Oct. 16, 1975, now U.S. Pat. No. 4,051,301, issued Sept. 27, 1977.

BACKGROUND OF THE INVENTION

(A) Statement Of The Invention

This invention relates to furan-modified phenolic resins which are potentially thermosetting for use in the coating of foundry sands.

(B) Description Of The Prior Art

The shell process for making metal castings and the like involves forming cores and/or molds from a sand coated with a thermosetting resin. In the practice of the shell process, a core or mold is formed in the desired configuration from the resin-coated sand, and then a metal is poured around the shell cores. The resin system slowly burns out, removing the resin binder from the system. As a result, the core collapses.

It has frequently been the practice to employ, as the resin in the shell process for making foundry core, phenolic novolak resins cured with hexamethylene tetramine. Such resins give high tensile strengths and consequently very strong cores.

One of the difficulties which has been incurred in the shell process stems from the incomplete decomposition or degradation of the resin binder. As will be appreciated by those skilled in the art, once the resin binder has been burned out or decomposes, the core, formed essentially of sand, becomes free flowing, and can be readily poured out of the casting. If, on the other hand, the phenolic novolak resin does not degrade to a sufficient extent, the core, or a portion thereof, remains inside the casting and must be removed by mechanical means. In some castings, such as engine blocks and heads, it is virtually impossible to remove pieces of core which have not been completely burned out and collapsed. Needless to say, if sand is left in an engine, a great deal of damage may result.

Iron and steel are generally poured at temperatures of the order of 2200°–3000° F. At those temperatures, burnout of the phenolic novolak resins is usually complete. However, aluminum, brass, bronze as well as other metals and alloys having lower melting points, are poured at temperatures of the order of 1200°–2000° F. At those lower temperatures, shakeout and collapsibility of cores is of greater concern. At such lower temperatures, phenolic novolak resins frequently do not burn out completely, with the result that cores or portions thereof are frequently left in the casting.

OBJECTS OF THE INVENTION

It is accordingly an object of the present invention to provide a resin for use in coating foundry sand to provide a resin-coated sand having improved shakeout and collapsibility characteristics.

It is a more specific object of this invention to produce and to provide a method for producing a furan-modified phenolic resin for use in coating foundry sands which is capable of being formed into cores highly susceptible to complete degradation, even at lower casting temperatures.

SUMMARY OF THE INVENTION

The concepts of the present invention reside in a phenolic novolak resin which has been modified to incorporate in the resin a furan. It has been unexpectedly found that phenolic novolak resins which incorporate furan therein can be used in coating foundry sands which in turn are ideally suited for use in the shell process to produce cores and molds having significantly improved shakeout and collapsibility characteristics.

The present invention also relates to a process for forming foundry cores and molds comprising the steps of:

(1) contacting a hot pattern with a free-flowing resin-coated sand comprising
  (a) particles of sand coated with about 1% to about 8% by weight of sand, of the furan-modified phenolic novolak resin of this invention; and,
  (b) a curing agent;

(2) maintaining the resin-coated sand against the hot pattern to bond a portion of the particles of resin-coated sand together to form a foundry mold or core;

(3) removing unbonded particles of resin-coated sand from the bonded particles of sand forming the foundry mold or core;

(4) curing the foundry mold or core at an elevated temperature, preferably at a temperature of 175° C. to 320° C., to form a dimensionally stable mold or core, and removing the foundry mold or core from the pattern.

The resin of this invention has been found to provide extremely good tensile strengths, and improved collapsibility and shakeout characteristics, even when used in the casting of lower melting metals.

DESCRIPTION OF THE PREFERRED EMBODIMENT

In the practice of this invention, the modified phenolic novolak resins of the invention are produced in one of two processes. In one type of process, a furan-containing compound, such as furfuryl alcohol or furfural is reacted with a phenolic compound in a first step to produce a furan-phenolic intermediate. That intermediate is then reacted in a second step with an aldehyde to produce the resin.

In another type of process, a phenolic-aldehyde resin is blended and/or reacted with a furan-containing component, either a furan resin or a furan-modified resin.

In the most preferred practice of this invention, the furan-modified phenolic novolak resins are produced by reacting, in a first step, furfuryl alcohol with a phenol at an acid pH, the mole ratio of the furfuryl alcohol to the phenol being within the range of 0.04 to 0.9, and preferably 0.05 to 0.30, to produce a furfuryl-phenolic intermediate. In the second step, the furfuryl-phenolic intermediate produced in the first step is in turn reacted with a $C_1$ to $C_3$ aliphatic aldehyde, the mole ratio in the latter step being 0.5 to 0.85 mole of the aldehyde to the total number of moles of the phenol and the furfuryl alcohol used in the reaction. The resins produced in this preferred embodiment of the invention are ideally suited for use in the manufacture of resin-coated sands. Such resin coated sands can in turn be used in the manufacture of foundry cores and molds having greatly improved collapsibility and shakeout characteristics.

It is an important concept of the preferred practice of this invention that the reaction between the furfuryl alcohol and the phenol to form the furfuryl-phenol intermediate and the reaction between that intermediate and the aldehyde be carried out at an acid pH. In U.S. Pat. No. 3,312,650, there is proposed a liquid resin for use in the so-called no-bake process in which furfuryl alcohol is reacted with phenol in the presence of an acid catalyst to produce an intermediate, which in turn is reacted with formaldehyde in the presence of a basic catalyst to form a resin. The resins described in that patent are of the resole type wherein the ratio of formaldehyde to phenol is greater than 1 to produce a thermosetting resin. As is described in the foregoing patent, it is necessary, to secure adhesion to sand, to contact the resin and the sand with an additional quantity of furfuryl alcohol and an acid curing agent to securely bond the resulting resin to the grains of sand. This additional step is not only complex from the standpoint of foundry operations, but is undesirable for the further reason that it represents an expensive and inefficient operation when used on a commercial scale.

In contrast, the resins of the present invention are, of necessity, solid resins (which can be placed in the liquid form by dissolution in the appropriate solvent). They are of the novolak type wherein the ratio of aldehyde to phenol is less than 1. As a result, the resins of this invention are thermoplastic and can be converted to a thermosetting form by addition of a curing agent.

In Canadian Pat. No. 473,649, there is described a method for producing a furan laminating varnish or the like prepared by reaction of excess furfuryl alcohol with a small amount of a phenol in the absence of any catalyst. The resulting intermediate can then be further modified by reaction with furfural or formaldehyde. The resin produced, which is other than a novolak resin, is used for different applications.

As used herein, the term "acid pH" refers to and includes a reaction mixture in which the pH is below 6, and preferably below 5. The reaction is therefore usually carried out in the presence of an acid catalyst which serves to adjust the pH of the reaction mixture to the desired level. Such catalysts are, of themselves, very well known in promoting condensation reactions of this type. Included are sulfuric acid, hydrochloric acid, sulfamic acid, oxalic acid and phenol sulfonic acid, although a variety of other strong acids may be used in their stead.

In the practice of this invention, use is preferably made of phenol, although all or a portion of the phenol in the reaction mixture can be replaced by small quantities of substituted phenols such as o-cresol, t-butylphenol, and the like. Phenol is nevertheless preferred as the phenolic reactant.

Similarly, a number of lower aliphatic aldehydes, and preferably those containing 1-3 carbon atoms are employed in the second step of the reaction. Suitable aldehydes include formaldehyde, acetaldehyde, propionaldehyde and paraformaldehyde. Best results are usually obtained with formaldehyde.

The temperature of the reaction which occurs in either the first or the second step is not critical and can be varied within fairly wide limits. In general, lower reaction temperatures necessitate longer reaction times, while higher reaction temperatures facilitate shorter reaction times. The phenol and the furfuryl alcohol are most frequently reacted at a temperature ranging from about 40° C. to about 100° C. in the presence of the catalyst. At these temperatures, the reaction is quite rapid, and thus can be carried out in any conventional reaction vessel. While it is not necessary to employ a solvent for the reaction, it is generally desirable to employ aqueous reactants and a catalyst dissolved in water, and thus water serves as an insert reaction medium. If desired, other inert solvents can be employed, although there is frequently no benefit derived from their use.

The second reaction between the aldehyde and the intermediate produced by reaction of furfuryl alcohol and the phenol can likewise be carried out at varying temperatures, depending somewhat on the reaction time. It is frequently desirable to employ a reaction temperature of at least 60° C. One particularly convenient mode of carrying out the reaction involves refluxing the reaction mixture at a temperature of about 100° C. At that temperature, the reaction is rapid and easily controlled. After the reaction is completed, the furan-modified phenolic novolak resin is separated from the reaction mixture.

While not equivalent to the preferred method described in detail, it is also possible to introduce furan into a phenolic novolak resin by reaction of furfural and phenol at an acid pH in a first step, and then, in a second step, adding formaldehyde and continuing the reaction at an acid pH. While the use of furfural does serve to introduce furan into the resin, it does not react readily, and the first step of the reaction is difficult to control. As a result, the finished product contains unreacted furfural, and thus has a bad odor and is toxic. In addition, resins produced in this way provide low tensile strengths in foundry applications according to the shell process.

One variation on the method described above is that the first step of the reaction can be carried out at a basic pH. In that embodiment, the reaction of the intermediate formed with the aldehyde can be conducted at either an acid or basic pH. However, the variation has the same disadvantages as described above. In addition, this variation requires the use of high reaction temperatures.

In another embodiment of this invention, it is also possible to react furfuryl alcohol and formaldehyde to produce a furan resin which in turn is blended and/or reacted with a phenolic novolak resin prepared by reaction of a lower aliphatic aldehyde as described with a phenol. Alternatively, it is possible to react phenol and formaldehyde at a basic pH to produce a resole resin, and then react the resole resin with furfuryl alcohol at an acid pH to form a furan-modified resole resin. That resin can be blended and/or reacted with a phenolic novolak resin prepared by reaction of an aldehyde with a phenol as described above.

In all of the variations described above for incorporating furan into the resin, the overall proportions of the furan-containing compound (furfuryl alcohol or furfural), the phenolic compound and the lower aliphatic aldehyde are generally the same as described above.

Generally, the process of coating sand with the resins of this invention utilizes coating methods well known to those skilled in the art. As noted, the resins produced in accordance with the concepts of this invention are in solid form, but can be rendered liquid by dissolution in a solvent or mixture of solvents such as methanol, ethanol, acetone, methyl ethyl ketone, or mixtures of those solvents in water.

There are presently three coating methods currently used to produce resin-coated sands for foundry applications. In the first of these methods, referred to as the cold coating method, the resin, dissolved in a suitable solvent, is blended with the curing agent and then mixed with sand at room temperature. The mixing operation is continued until the solvent has evaporated to deposit the solid resin on the grains of sand. In this particular method, no heating of any of the components is required, and thus this particular method requires somewhat longer mixing times.

In the second method, the so-called warm coating method, the solid resin is dissolved in a solvent and mixed with the curing agent. The mixture of the resin and curing agent is then blended with sand which has been heated to an elevated temperature, preferably a temperature within the range of 180° to 212° F. Since the sand has been heated to an elevated temperature, the time required for evaporation of the solvent is reduced as compared to the cold coating method.

In the third method, which is perhaps the most commonly employed method, the sand is heated to an elevated temperature, generally ranging from 115° C. to about 150° C., and is then blended with resin in solid form, and preferably in flake form. The elevated temperature to which the sand has been heated is sufficient to melt the flakes of resin to thereby coat the sand. This method, referred to as the hot coating method, then involves quenching the resin-coated sand with a solution of curing agent dissolved in an appropriate solvent, usually water, to quench the sand and add curing agent to the resulting resin-coated sand.

In each case, the resulting resin-coated sand is free flowing and contains a curing agent to convert the thermoplastic furan-modified phenolic novolak resin to a hard, rigid potentially thermosetting resin. Preferred curing agents are amine curing agents such as hexamethylene tetramine, although a number of other curing agents well known to those skilled in the art may be used instead. Best results are usually obtained when the amount of curing agent ranges from about 7 to 20% by weight based upon the weight of the resin.

As has become common practice in the foundry art, coated sand compositions employed in the practice of this invention preferably are formulated to contain a release agent to facilitate removal of cores and molds produced therefrom from the core base. Such release agents also improve core density and increase tensile strengths. The coated sand compositions of this invention can be used with or without such release agents. Representative release agents include metal stearates such as calcium stearate, zinc stearate and the like; fatty amides such as the bistearoylamide of ethylene diamine; silicones and other art recognized release agents. They may be added to the muller during the sand coating process, or they may be dissolved or dispersed in the resin prior to coating the resin or sand.

In addition to such release agents, the coated sand compositions of this invention can also include other conventional additives frequently used. The use of such additional additives depends largely on the specific casting requirements of a given application. Illustrative additives are iron oxide, manganese dioxide, $KBF_4$, $NH_4BF_4$, clay, mill scale, Vinsol and urea. The use of urea is particularly advantageous in some applications for it provides rapid buildup rates and cure rates as described in U.S. Pat. No. 3,838,095, the disclosure of which is incorporated herein by reference.

Any of a variety of conventional foundry sands may be employed in the practice of this invention. Such sands include silica sand, lake sand, bank sand, zircon sand, olivine sand, chromite sand, zircor sand, aluminum silicate sand, etc., as well as combinations thereof.

The invention is further illustrated by the following examples, which, however, are not to be taken as limiting in any respect. All parts and percentages, unless expressly stated to be otherwise, are by weight.

EXAMPLE 1

This example describes the preparation of a conventional phenolic novolak resin useful in the shell process. This resin is used as a control for comparison.

A charge of 2,000 parts of phenol, 167 parts of 37% formaldehyde and 100 parts of a 20% solution of sulfamic acid was placed in a reactor. The mixture was heated to reflux and then 1127 parts of 37% formaldehyde added slowly at a rate which maintained gentle reflux. The mixture was kept at 100° C. for 2½ hours after the addition of 37% formaldehyde was completed. The resin was dehydrated to remove all water and 100 parts of bistearoxylamide of ethylene diamine added. The hot resin was then converted to flake form by passing it through a two roll mill equipped with cooled stainless steel rollers.

EXAMPLE 2

This is an example of a furan-modified novolak resin embodying the concepts of this invention.

A charge of 2,000 parts of phenol and 100 parts of 20% sulfamic acid solution in water was added to a reactor and heated to 60° C. Then 300 parts of furfuryl alcohol was added over a 10 minute period during which the temperature of the mixture rose to 90° C. Then 1,250 parts of 37% formaldehyde was added at such a rate as to keep the batch refluxing. The mixture was kept at 100° C. for 2½ hours after completion of the formaldehyde addition. The resin was dehydrated to remove all water and 100 parts of bistearoxylamide of ethylene diamine added. The hot resin was then converted to flake form by passing it through a two roll mill equipped with cooled stainless steel rollers.

EXAMPLE 3

This sample illustrates the use of the resins of the present invention in the coating of sand, and the use of such sands in producing collapsible foundry cores and molds.

Coated sands were prepared as follows: 1,000 g. of Wedron 7020 sand was heated to 130° C. and added to a laboratory muller. Then 30 g. of flake resin was added and mulled for 90 seconds. Then 14.50 ml. of a 28% solution of hexamethylene tetramine in water were added. Mulling was continued until the mixture broke up into free flowing grains of coated sand. The coated sands were discharged from the muller.

Tensile tests were run on the coated sands produced with the control resin as described in Example 1 and the furan-modified flake of this invention as described in Example 2.

The hot tensile strengths were determined by use of the Dietert No. 365 Hot Shell Tensile Tester. Tests were run at 450° F. (232.5° C.) with a 3 minute cure time.

The cold tensiles were determined by making ¼ inch thick dog bone test briquets in a Dietert No. 363 Heated Shell Curing Accessory. The test briquets were cured for 3 minutes at 450° F. and allowed to cool to room temperature. The cold tensiles were then determined by using a 401 Universal Sand Strength Tester in the manner set forth by the American Foundryman's Society.

The results of the tests are as follows:

| Coated Sand | Control Example 1 | Example 2 |
|---|---|---|
| Cold Tensile (psi) | 513 | 480 |
| Hot Tensile (psi) | 410 | 390 |

These results show that the furan-modified novolak resin gives coated sand with good strength characteristics similar to the control.

The relative collapsibility of foundry cores can be determined in the laboratory by placing core specimens in a high temperature oven under pressure. The time required for the core to collapse under pressure and heat is determined. The shorter the time to collapse, the better the collapsibility of the core. The Dietert No. 785 Thermolab Dilatometer is a commercial testing machine used to measure core collapsibility. A No. 785 machine was used to measure the collapsibility of cured 1⅛ inch by 2 inch cylindrical cores at 1850° F. (996° C.) under 75 psi pressure. Data obtained with coated sands are given below:

| | Control Example 1 | Example 2 |
|---|---|---|
| Collapsibility time, sec. | 1078 | 431 |

The core produced using the furan-modified resin of Example 2 has much better collapsibility than the control.

EXAMPLE 4

This example describes the preparation of a furan-modified phenolic resin in which the furfuryl alcohol is incorporated by reaction with a resole resin and the resulting product blended with a phenolic novolak.

A charge of 450 parts phenol, 680 parts of 37% formaldehyde solution and 9 parts of lime was placed in a reactor. The mixture was heated at 70° C. until the free formaldehyde was less than 1%. The resin was cooled to 45° C. and neutralized by adding 22.5 parts of concentrated HCl diluted with 67.5 parts of water. The resin was then dehydrated to a refractive index of 1.573. Then, 2,400 parts of furfuryl alcohol was added and the pH adjusted to 3.1 by addition of HCl. The resin was reacted for one hour at 95° C. and then dehydrated to a water content of 1.3%.

A furan-modified phenolic resin was then made by blending the above resin with the novolak resin described below.

A charge of 2,000 parts of phenol, 167 parts of 37% formaldehyde and 100 parts of a 20% solution of sulfamic acid was placed in a reactor. The mixture was heated to reflux and then 1,140 parts of 37% formaldehyde added slowly at a rate which maintained gentle reflux. The mixture was kept at 100° C. for 2½ hours after the addition was completed. The water was removed by vacuum dehydration to give a novolak resin.

One hundred and eighty parts of this novolak resin were then blended with 20 parts of furan-modified resin described above and heated for a ½ hour at 105° C. Then 10 parts of bistearoylamide of ethylene diamine was added and the resin heated to 150° C. to remove the water. The hot resin was converted to flake form by passing it through a two roll mill equipped with cooled stainless steel rollers.

The resin was evaluated by coating it on sand as described in Example 3. Results are summarized below:

| Cold Tensile (psi) | 380 |
|---|---|
| Hot Tensile (psi) | 290 |
| Collapsibility time, sec. | 483 |

While the invention has been described in connection with specific embodiments thereof, it will be understood that it is capable of further modification, and this application is intended to cover any variations, uses, or adaptions of the invention following, in general, the principles of the invention and including such departures from the present disclosure as come within known or customary practice in the art to which the invention pertains and as may be applied to the essential features hereinbefore set forth, as fall within the scope of the invention.

What is claimed is:

1. A novolak resin prepared by:
   (a) reacting of furfuryl alcohol with a phenol at an acid pH, with the mole ratio of furfuryl alcohol to the phenol being within the range of 0.04 to 0.9, to produce a furfuryl-phenolic intermediate, and
   (b) reacting of said intermediate with a $C_1$ to $C_3$ aliphatic aldehyde at an acid pH, with the molar ratio of aldehyde to the total of the phenol and furfuryl alcohol being within the range of 0.5 to 0.85 and
   (c) separating the resin.

2. A resin as defined in claim 1 wherein the phenol is phenol and the aldehyde is formaldehyde.

3. A resin as defined in claim 1 wherein the furfuryl alcohol is reacted with the phenol at a temperature within the range of about 40° C. to about 100° C.

4. A resin as defined in claim 1 wherein the intermediate is reacted with the aldehyde at a temperature of at least 60° C.

5. A resin as defined in claim 1 wherein the molar ratio of furfuryl alcohol to the phenol is within the range of about 0.05 to about 0.30.

6. A resin as defined in claim 1 wherein the reaction of the intermediate with the aldehyde is carried out at an acid pH below 6.

7. A resin as defined in claim 1 wherein the reaction of the phenol and furfuryl alcohol and the reaction of the intermediate with the aldehyde are carried out in the presence of an acid catalyst to maintain the pH of the reaction below 6.0.

8. A resin as defined in claim 7 wherein the acid catalyst is selected from the group consisting of sulfuric acid, hydrochloric acid, sulfamic acid, oxalic acid and phenol sulfonic acid.

9. A method for the preparation of a furanmodified novolak resin comprising:
   (a) reacting of furfuryl alcohol with a phenol at an acid pH; with the mole ratio of furfuryl alcohol to the phenol being within the range of 0.04 to 0.9, to produce a furfuryl-phenolic intermediate, and
   (b) reacting of said intermediate with a $C_1$ to $C_3$ aliphatic aldehyde at an acid pH, with the molar ratio of aldehyde to the total of the phenol and furfuryl alcohol being within the range of 0.5 to 0.85 and
   (c) separating the resin.

10. A method as defined in claim 9 wherein the phenol is phenol and the aldehyde is formaldehyde.

11. A method as defined in claim 9 wherein the furfuryl alcohol is reacted with the phenol at a temperature within the range of about 40° C. to about 100° C.

12. A method as defined in claim 9 wherein the intermediate is reacted with the aldehyde at a temperature of at least 60° C.

13. A method as defined in claim 9 wherein the molar ratio of furfuryl alcohol to the phenol is within the range of about 0.05 to about 0.30.

14. A method as defined in claim 9 wherein the reaction of the intermediate with the aldehyde is carried out at an acid pH below 6.

15. A method as defined in claim 9 wherein the reaction of the phenol and furfuryl alcohol and the reaction of the intermediate with the aldehyde are carried out in the presence of an acid catalyst to maintain the pH of the reaction below 6.0.

16. A method as defined in claim 9 wherein the acid catalyst is selected from the group consisting of sulfuric acid, hydrochloric acid, sulfamic acid, oxalic acid and phenol sulfonic acid.

17. A novolak resin prepared by:
  (a) reacting a furan compound selected from the group consisting of furfuryl alcohol and furfural with a phenol in the presence of a basic or acid catalyst to promote a condensation reaction of the furan compound with the phenol, with the mole ratio of the furan compound to the phenol being within the range of 0.04 to 0.9, to produce a furan-phenolic intermediate,
  (b) reacting said intermediate with a $C_1$ to $C_3$ aliphatic aldehyde in the presence of a basic or acid catalyst to promote a condensation reaction between the aldehyde and the intermediate, with the mole ratio of the aldehyde to the total of the phenol and furan compound being within the range of 0.5 to 0.85, and
  (c) separating the resin.

18. A resin as defined in claim 17 wherein the catalyst of (a) and (b) is an acid catalyst.

19. A resin as defined in claim 18 wherein the furan compound is furfuryl alcohol.

20. A resin as defined in claim 17 wherein the furan compound is furfural.

21. A resin as defined in claim 20 wherein the catalyst of (a) and (b) is a basic catalyst.

22. A resin prepared by:
  (a) providing a furan-containing resin selected from the group consisting of:
    (1) a furan resin prepared by reaction of furfuryl alcohol with a $C_1$ to $C_3$ aliphatic aldehyde in the presence of an acid catalyst, and
    (2) a furan modified resin prepared by reaction of a phenol and a $C_1$ to $C_3$ aliphatic aldehyde to produce a resole resin and then reacting the resole resin with furfuryl alcohol; and
  (b) blending the furan-containing resin with a novolak resin prepared by reaction of a phenol with a $C_1$ to $C_3$ aliphatic aldehyde, with the ratio of the total of the aldehyde contained in the furan-containing resin and the novolak resin to the phenol of the novolak resin and the furfuryl alcohol of the furan-containing resin being within the range of 0.5 to 0.85 and the ratio of furfuryl alcohol of the furan-containing resin to the phenol of the novolak resin is within the range of 0.04 to 0.9.

23. A resin as defined in claim 22 wherein the aldehyde is formaldehyde and the phenol is phenol.

24. A resin as defined in claim 22 wherein the furan-containing resin is (2), and the phenol is reacted with the aldehyde in the presence of a basic catalyst and the furfuryl alcohol is reacted with the resole resin in the presence of an acid catalyst.

25. A resin as defined in claim 22 wherein the novolak resin is prepared in the presence of an acid catalyst.

26. A resin as defined in claim 22 wherein the furan-containing resin is (1).

27. A method for the preparation of a novolak resin comprising:
  (a) reacting a furan compound selected from the group consisting of furfuryl alcohol and furfural with a phenol in the presence of a base or acid catalyst to promote a condensation reaction of the furan compound with the phenol, with the mole ratio of the furan compound to the phenol being within the range of 0.04 to 0.9, to produce a furan-phenolic intermediate,
  (b) reacting said intermediate with a $C_1$ to $C_3$ aliphatic aldehyde in the presence of a basic or acid catalyst to promote a condensation reaction between the aldehyde and the intermediate, with the mole ratio of the aldehyde to the total of the phenol and furan compound being within the range of 0.5 to 0.85, and
  (c) separating the resin.

28. A method as defined in claim 27 wherein the catalyst of (a) and (b) is an acid catalyst.

29. A method as defined in claim 28 wherein the furan compound is furfuryl alcohol.

30. A method as defined in claim 27 wherein the furan compound is furfural.

31. A method as defined in claim 30 wherein the catalyst of (a) and (b) is a basic catalyst.

32. A method for the preparation of a resin comprising:
  (a) providing a furan-containing resin selected from the group consisting of:
    (1) a furan resin prepared by reaction of furfuryl alcohol with a $C_1$ to $C_3$ aliphatic aldehyde in the presence of an acid catalyst, and
    (2) a furan modified resin prepared by reaction of a phenol and a $C_1$ to $C_3$ aliphatic aldehyde to produce a resole resin and then reacting the resole resin with furfuryl alcohol; and
  (b) blending the furan-containing resin with a novolak resin prepared by reaction of a phenol with a $C_1$ to $C_3$ aliphatic aldehyde, with the ratio of the total of the aldehyde contained in the furan-containing resin and the novolak resin to the phenol of the novolak resin and the furfuryl alcohol of the furan-containing resin being within the range of 0.5 to 0.85 and the ratio of furfuryl alcohol of the furan-containing resin to the phenol of the novolak resin is within the range of 0.04 to 0.9.

33. A method as defined in claim 32 wherein the aldehyde is formaldehyde and the phenol is phenol.

34. A method as defined in claim 32 wherein the furan-containing resin is (2), and the phenol is reacted with the aldehyde in the presence of a basic catalyst and the furfuryl alcohol is reacted with the resole resin in the presence of an acid catalyst.

35. A method as defined in claim 32 wherein the novolak resin is prepared in the presence of an acid catalyst.

36. A method as defined in claim 32 wherein the furan-containing resin is (1).

* * * * *